United States Patent [19]

Knuijt

[11] Patent Number: 5,271,217
[45] Date of Patent: Dec. 21, 1993

[54] MOUNTING ARRANGEMENT FOR A SINGLE SHAFT COMBINED CYCLE SYSTEM

[75] Inventor: Hans Knuijt, Niskayuna, N.Y.

[73] Assignee: General Electric Company, Schenectady, N.Y.

[21] Appl. No.: 987,784

[22] Filed: Dec. 9, 1992

[51] Int. Cl.$^5$ ................................. F02L 7/20
[52] U.S. Cl. .................... 60/39.31; 248/901; 415/213.1
[58] Field of Search .............. 60/39.182, 39.31, 39.32; 415/213.1; 248/901

[56] References Cited

U.S. PATENT DOCUMENTS

| | | | |
|---|---|---|---|
| 4,456,426 | 6/1984 | Bellati | 415/219 R |
| 4,489,991 | 12/1984 | Delam | 384/428 |
| 4,697,984 | 10/1987 | Takeuchi et al. | 415/142 |
| 4,783,986 | 11/1988 | Koshelev | 72/455 |
| 4,883,250 | 11/1989 | Yano et al. | 248/638 |
| 4,961,310 | 10/1990 | Moore et al. | 60/39.182 |
| 5,051,061 | 9/1991 | Meylan | 415/104 |

FOREIGN PATENT DOCUMENTS 0769046  10/1980  U.S.S.R. ................. 60/39.31

OTHER PUBLICATIONS

"GE Combined-Cycle Product Line and Performance", GE Turbine Reference Library, Chase et al., Schenectady, N.Y., Dec. 1989.

Primary Examiner—Edward K. Look
Assistant Examiner—W. J. Wicker
Attorney, Agent, or Firm—Nixon & Vanderhye

[57] ABSTRACT

A power generation system comprising a gas turbine, a steam turbine and a generator are mounted on a foundation in substantial axial alignment and connected by a single shaft. A thrust bearing is located on the shaft in one of the gas turbine and steam turbine. Whichever of the gas turbine and steam turbine contains the thrust bearing is flexibly secured to the foundation, and the other of the gas turbine and the steam turbine, as well as the generator, are rigidly secured to the foundation. A pair of rigid tie rods also extend between the steam and gas turbines, parallel to the shaft, to maintain a predetermined axial distance between the turbines, while allowing relative movement in a plane perpendicular to the shaft.

13 Claims, 1 Drawing Sheet

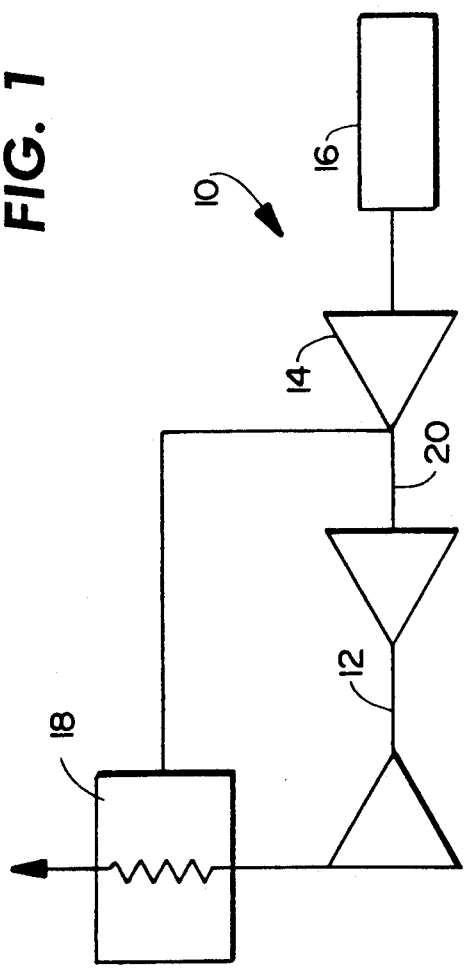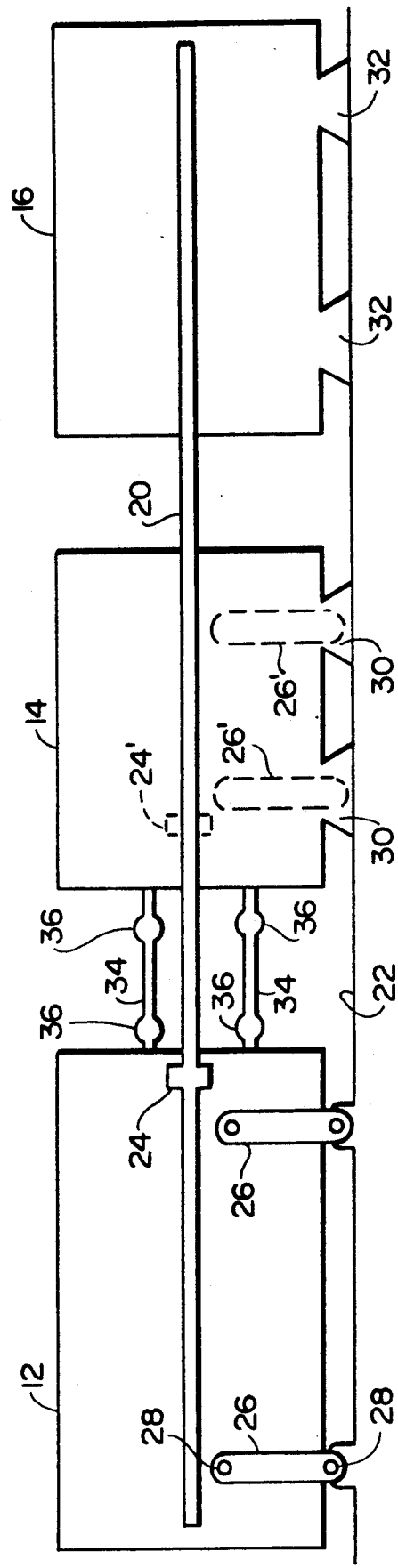

MOUNTING ARRANGEMENT FOR A SINGLE SHAFT COMBINED CYCLE SYSTEM

TECHNICAL FIELD

This invention relates to combined cycle (steam and gas) systems for power generation or power and thermal energy production. More specifically, the invention relates to a foundation mounting arrangement for the gas turbine, steam turbine and generator components of a combined cycle, single shaft system.

BACKGROUND ART

Combined cycle systems utilizing both gas turbines and steam turbines in combination with a generator are known. Such systems include both single shaft and multi-shaft configurations. A typical reheat combined cycle system consists of one gas turbine, one steam turbine, one generator and one heat recovery steam generator. The gas turbine and steam turbine are coupled to the single generator in a tandem arrangement by means of a single shaft. The known single shaft combined cycle units have been lower power units (relative to the present invention) in which the gas turbine, steam turbine and generator have been hard mounted to the foundation. In such units, both gas and steam turbines have their own thrust bearings for rotor axial clearance control. The axial thermal expansions in the rotor shaft are taken up with a flexible coupling located in the rotor shaft somewhere between the gas and steam turbines.

DISCLOSURE OF THE INVENTION

In larger combined cycle, single shaft power generation units, the large shaft torque makes it difficult to include a flexible coupling which would take up any cold to hot thermal growths. Since it is a single shaft with no flexible couplings, only one thrust bearing is designed into the system. Since axial clearances are very important in both the gas and steam turbines, the turbine units are placed next to each other in line, and the thrust bearing located in a way to minimize the effect of shaft thermal expansions. Thus, if the thrust bearing is located in the gas turbine, then it is located as close to the steam turbine as possible. On the other hand, if the steam turbine is chosen as the location for the thrust bearing, then the bearing will be placed as close to the gas turbine as possible. This single shaft system as described above requires that the relative axial motion between the steam and gas turbines be controlled.

The present invention solves the relative axial motion problem by supporting these large gas turbines or steam turbines such that the unit as a whole is isolated from axial distortions of the foundation and supporting structures. At the same time, the mounting arrangement eliminates relative axial motion between the gas turbine and steam turbine.

In an exemplary embodiment of the invention, four pivoting support legs flexibly mount either the gas turbine or the steam turbine to the supporting foundation. If the gas turbine is provided with the thrust bearing, then it is the gas turbine which is secured to the foundation by means of the four pivoting support legs. On the other hand, if the thrust bearing is located in the steam turbine, then it is the steam turbine which is mounted to the foundation through the use of the four pivoting support legs. In either case, a pair of tie rods, extending substantially parallel to the single shaft, connect the gas turbine to the steam turbine to maintain a predetermined axial distance therebetween. The tie rods may incorporate joints, however, which will permit relative up and down, and side to side movement of the steam turbine relative to the gas turbine.

In accordance with the broader aspects of the invention, therefore, there is provided a power generation system including a gas turbine, a steam turbine and a generator mounted on a foundation, in substantially axial alignment and wherein the gas turbine, steam turbine and generator are connected by a single shaft, the improvement comprising a flexible connection between one of the gas turbine or the steam turbine and the foundation, and a rigid connection between the other of the gas turbine or steam turbine and the foundation; a rigid connection between the generator and the foundation; and a pair of tie rods extending substantially parallel to the shaft and between the gas turbine and the steam turbine.

This particular solution to the above described problem has the advantages of allowing the elimination of a thrust bearing, a flexible coupling in the rotor shaft and the gas turbine insulation, while accommodating axial thermal growths in the foundation. The mounting arrangement of this invention can also be implemented with various foundation schemes.

BRIEF DESCRIPTION OF THE DRAWINGS

FIG. 1 is a schematic diagram of a known single shaft combined cycle power generation system; and FIG. 2 is a partially schematic side view of a gas turbine, steam turbine and generator mounting arrangement in accordance with this invention.

BEST MODE FOR CARRYING OUT THE INVENTION

FIG. 1 schematically shows a known reheat, combined-cycle, single shaft system 10 typically utilized for electric power production and industrial cogeneration applications. Such a system includes a gas turbine 12, a steam turbine 14 and a generator 16. A heat recovery steam generator 18, auxiliaries and plant controls (not shown) are matched to the equipment to form an integrated power system as will be appreciated by those skilled in the art. In the illustrated embodiment, the gas turbine 12 and steam turbine 14 are coupled to the generator 16 in a tandem arrangement by a single shaft 20.

With reference now to FIG. 2, the gas turbine 12, steam turbine 14 and generator 16 are shown in place on a supporting foundation 22 in accordance with an exemplary embodiment of the invention. A conventional thrust bearing 24 for the single shaft 20 is located in the gas turbine 12, at that end of the gas turbine 12 closest the steam turbine 14. The gas turbine 12 is mounted on the foundation 22 by means of four pivoting support legs 26 (two shown), one pair at each end of the gas turbine. Legs 26 are each pivotally secured to the gas turbine 12 and foundation, respectively, at opposite ends by means of pins 28, thus forming a "parallel linkage" type mounting arrangement between the gas turbine 12 and foundation 22. This arrangement allows the foundation 22, typically concrete, to deform thermally (axially) without causing the gas turbine 12 to move forward (toward the steam turbine 14) or rearward (away from the steam turbine 14).

The steam turbine 14 is hard mounted to the foundation 22 via support legs 30 which are typically bolted to the foundation. The generator 16 is similarly mounted via support legs 32.

The gas turbine 12 and steam turbine 14 are also connected to each other by means of a pair of rigid tie rods 34 extending substantially parallel to the shaft 20 and fixed between opposed faces of the gas and steam turbines 12, 14. The tie rods 34 may each be provided with a pair of spherical or hinge joints 36 adjacent opposite ends of the respective tie rod 34. These tie rods 34 serve to maintain a predetermined axial distance between the gas and steam turbines under all conditions of operation, but allow some relative movement in a plane perpendicular to the shaft 20. In other words, this arrangement accommodates some movement (up and down, and side to side) of the steam turbine relative to the gas turbine to thereby prevent undesirable bending stresses in the tie rods.

In accordance with the invention, the hinged or flexible mounting arrangement is employed with the turbine unit 12 or 14 in which the thrust bearing 24 is located. In the above described embodiment, the thrust bearing 24 is located in the gas turbine 12, and the latter is flexibly mounted to the foundation 22. It will be appreciated that in the event the thrust bearing 26 is located in the steam turbine 14, the latter will be secured to the foundation 22 by means of the pivoting support legs 26. This alternative arrangement is shown in phantom in FIG. 2 with common reference numerals but with a "prime" designation added.

In either of the above described embodiments, the support legs 26 are preferably of stainless steel construction and, in one embodiment, may be about 2 inches thick and 60 inches long.

The above described mounting arrangements thus permit large combined cycle, single shaft units to be isolated from axial distortions of the supporting foundation (and other associated supporting structures), while also eliminating relative axial motion between the gas turbine and steam turbine units themselves. The arrangement also facilitates the incorporation of earthquake protection measures, e.g., if a well designed clearance pin is used to replace the shipping pin in the forward gas turbine gib location.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. In a power generation system including a gas turbine, a steam turbine and a generator mounted on a foundation, in substantially axial alignment and wherein the gas turbine, steam turbine and generator are connected by a single shaft, the improvement comprising:

a flexible connection between one of the gas turbine or the steam turbine and the foundation, and a rigid connection between the other of the gas turbine or steam turbine and the foundation;

a rigid connection between the generator and the foundation; and a pair of tie rods extending substantially parallel to said shaft and between the gas turbine and the steam turbine.

2. The power generation system of claim 1 wherein a thrust bearing for the shaft is located in the gas turbine.

3. The power generation system of claim 2 wherein the flexible connection is between the gas turbine and the foundation.

4. The power generation system of claim 1 wherein a thrust bearing for the shaft is located in the steam turbine.

5. The power generation system of claim 4 wherein the flexible connection is between the steam turbine and the foundation.

6. The power generation system of any claims 1-5 wherein each tie rod is provided with a pair of hinge joints adjacent opposite ends of the tie rod which permit relative movement between the steam turbine and gas turbine in two degrees of movement perpendicular to said shaft.

7. The power generation system of any of claims 1-5 wherein each tie rod is provided with a pair of spherical joints adjacent opposite ends of the tie rod which permit relative movement between the steam turbine and gas turbine in two degrees of movement perpendicular to said shaft.

8. A power generator system comprising a gas turbine, a steam turbine and a generator mounted on a foundation in substantial axial alignment and connected by a single shaft, a thrust bearing located on the shaft in one of the gas turbine and steam turbine; said one of the gas turbine and steam turbine being flexibly secured to the foundation, and the other of said gas turbine and said steam turbine being rigidly secured to the foundation; wherein a pair of tie rods extend between said gas turbine and said steam turbine substantially parallel to said single shaft to thereby maintain a predetermined axial distance between said steam turbine and said gas turbine.

9. The power generation system of claim 8 wherein said flexible mounting arrangement includes two pair of support legs, each having first and second ends and each pivotally secured to said foundation at said first ends and to said one of said gas turbine and steam turbine at said second ends.

10. The power generation system of claim 8 wherein each tie rod is provided with a pair of hinge joints adjacent opposite ends of the tie rods.

11. The power generation system of claim 8 wherein each tie rod is provided with a pair of spherical joints adjacent opposite ends of the tie rods.

12. The power generation system of claim 8 wherein said one of said gas turbine and steam turbine comprises said gas turbine.

13. The power generation system of claim 8 wherein said one of said gas turbine and steam turbine comprises said steam turbine.

* * * * *